UNITED STATES PATENT OFFICE 2,525,084

PRODUCTION OF ESTERS OF BETA-ALKOXY-GAMMA-AMINOCROTONATES

John O. Van Hook, Philadelphia, and Willard J. Croxall, Bryn Athyn, Pa., assignors to Rohm & Haas Company, Philadelphia, Pa., a corporation of Delaware No Drawing. Application March 17, 1949,
Serial No. 82,002

4 Claims. (Cl. 260—247)

This invention deals with gamma-aminocarboxlyic esters and with a process by which they are prepared. These esters have the formula

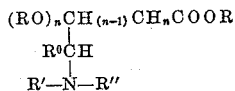

wherein R is a non-tertiary hydrocarbon group, $n$ is an integer from one to two, $R^0$ is hydrogen or a monovalent hydrocarbon group, and R' and R'' are monovalent hydrocarbon groups when taken individually but when taken together constitute a saturated divalent chain which has four to five carbon atoms and which forms a five-to six-sided heterocycle with the nitrogen. It is preferred that R be an alkyl group and contain not over twelve carbon atoms, that the group $R^0$ not exceed a content of eight carbon atoms, and the R' and R'' together contain not over eleven carbon atoms.

The aminoesters are prepared by reacting together at 20° to 110° C. in the presence of an anhydrous, strongly basic catalyst a carbonate ester and a tertiary propargylmonoamine. A temperature range of 40° to 90° C. is preferred for carrying on the reaction which may be performed without or with an anhydrous, inert, organic solvent, such as ethyl ether, isopropyl ether, toluene, xylene, an aromatic naphtha, or the like. Excess alkyl carbonate may be used as a solvent. When the reaction has been well advanced, the catalyst is destroyed and the reaction products isolated. These are both saturated and unsaturated aminoesters. They are generally distillable under reduced pressure and have the respective formulas

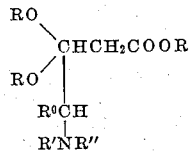

and

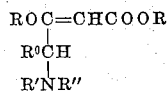

The former is converted to the latter when it is heated in the presence of a basic catalyst and a mole of the alcohol ROH distilled therefrom.

These are useful chemical intermediates, providing chemical substances having physiological activity and also insecticidal activity. They are softeners and plasticizers of resinous materials.

The dialkyl carbonates which are used to form the above reaction products have the structure $$(RO)_2CO$$

where R is a non-tertiary hydrocarbon group; i. e., a primary or secondary hydrocarbon group. R is any hydrocarbon group which forms a non-tertiary alcohol, ROH. It may be saturated or unsaturated, of straight or branched chain structure, and may be aliphatic, cycloaliphatic, or aralkyl. Thus, R may be such a group as methyl, ethyl, propyl, isopropyl, butyl, isobutyl, sec.-butyl, amyl, hexyl, heptyl, octyl, nonyl, dodecyl, allyl, methallyl, crotyl, cinnamyl, benzyl, methylbenzyl, butylbenzyl, cyclohexyl, or methylcyclohexyl. It is preferred that R be an alkyl group and contain not over twelve carbon atoms.

The propargylamines which are reacted with the above esters have the structure

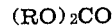

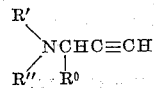

where R', R'', and $R^0$ have the meanings given above. The groups R' and R'' may be the same or may be different. They may be alkyl groups such as methyl, ethyl, propyl, butyl, amyl, hexyl, heptyl, octyl, or decyl; unsaturated aliphatic groups such as allyl or crotyl; cycloaliphatic such as cyclohexyl; aralkyl such as benzyl or methylbenzyl; and aryl such as phenyl or methylphenyl. They may also together form a saturated divalent chain, such as —CH₂CH₂CH₂CH₂—, —CH₂CH₂CH₂CH₂CH₂—, —CH₂CH₂OCH₂CH₂—, and —CH₂CH₂SCH₂CH₂—, which occur in the secondary amines pyrrolidine, piperidine, morpholine, and thiamorpholine respectively.

The term $R^0$ represents a monovalent hydrocarbon group or hydrogen. When it is the former, it may be methyl, ethyl, propyl, butyl, isobutyl, hexyl, or other alkyl group, straight-chained or branched, allyl, cyclohexyl, phenyl, or the like.

The propargylamines are available through the reaction of a secondary amine, an aldehyde, and acetylene in the presence of a heavy metal of the first or second groups of the usual periodic table. In particular, copper and its salts such as cuprous chloride, copper acetate, or copper formate are useful as catalysts. Temperatures of reaction as high as 120° C. may be used depending upon the particular combination of reactants. Additional details of a method of preparation of tertiary propargylamines will be found in U. S. Patent No. 2,273,141, issued February 17, 1942.

Typical of aldehydes which may be used in the above reaction are formaldehyde, acetaldehyde, propionaldehyde, butyraldehyde, heptaldehyde, 2-ethylhexaldehyde, 3,3,5-trimethylhexaldehyde, benzaldehyde, hexahydrobenzaldehyde, 2-ethylpropylacrolein, etc. Amines which are useful include dimethylamine, diethylamine, diisopropylamine, diallylamine, dibutylamine, diamylamine, benzylmethylamine, dicyclohexylamine, hexylmethylamine, methylisononylamine, methylaniline, etc.

As catalysts for the reaction between carbonate and propargylamine there is used a strongly basic catalyst. These fall into three major types, (1) alkali metal acetylides such as sodium acetylide or potassium acetylide, and alkali metal acetylides of the propargylamines, (2) alkali metal alcoholates, such as sodium or potassium methylate, ethylate, butoxide, or octoxide, and (3) quaternary ammonium alcoholates, the quaternary group of which is capable of yielding a quaternary ammonium hydroxide, such as tetramethyl ammonium methoxide, trimethyl benzyl ammonium ethoxide, trimethyl benzyl tert.-butoxide, dimethyl dibenzyl ammonium methoxide, trimethyl chlorobenzyl ammonium ethoxide, etc.

There are other alkaline agents which may be taken as catalysts, such as sodium metal, potassium metal, sodium hydride, or sodium amide. These react with carbonate ester to form an alcoholate or the acetylenic group to form an acetylide. These are, therefore, equivalents of the above catalysts.

The proportion of catalyst may vary over an exceptionally wide range. From one mole per cent to over 100 mole per cent of catalyst may be used per mole of propargylamine. Preferred proportions are 0.1 mole of catalyst to one mole per mole of propargylamine.

The preparation of the gamma-aminoesters of this invention is illustrated with the following examples:

EXAMPLE 1

Ethyl beta-ethoxy-gamma-dimethylaminocrotonate

A mixture of 1770 grams (15.0 moles) of ethyl carbonate and 149 grams (0.63 mole) of benzyltrimethylammonium ethoxide containing an equivalent of ethanol was stirred and maintained at 37°–41° C. by cooling while 344 grams (4.15 moles) of 3-dimethyl-amino-1-propyne was added during the period of an hour and the stirring was continued for an additional 34 hours while the temperature was maintained at 37°–41° C. The mixture was then cooled and neutralized by the addition of 37 grams (0.62 mole) of glacial acetic acid in ice water. The resulting two layers were separated. The organic layer was dried over sodium sulfate (anhydrous) and distilled. There was obtained a mixture of 106 grams of unreacted dimethylaminopropyne and 1403 grams of unreacted ethyl carbonate which boiled below 40° C./2 mm. and 532 grams (2.51 moles) of a mixture of 74% ethyl beta-ethoxy-gamma-dimethylaminocrotonate and 26% ethyl beta,beta-diethoxy-gamma-dimethylaminobutyrate (as estimated by titration with standard acid), which boiled at 80°–150° C./2 mm. The yield of combined product was 410% based on catalyst, 72% based on propyne and 81% based on carbonate.

The mixture was heated over sodium ethoxide (2 grams) and distilled to produce pure ethyl beta-ethoxy-gamma-dimethylaminocrotonate which had a boiling point of 76°–78° C./0.5 mm. and a refractive index, $n_D^{20}$, of 1.4620.

On analysis, the ethyl beta-ethoxy-gamma-dimethylaminocrotonate was found to have a carbon content of 59.51%, a hydrogen content of 9.48%, a nitrogen content of 6.91%, and an equivalent weight of 200, while the calculated values for $C_{10}H_{19}NO_3$ are carbon, 59.69%, hydrogen, 9.49%, nitrogen, 6.96%, and equivalent weight, 201.

EXAMPLE 2

Ethyl beta-ethoxy-gamma-diethylaminocrotonate

A mixture of 362 grams (3.0 moles) of ethyl carbonate, 111 grams (0.46 mole) of benzyl trimethyl ammonium ethoxide containing an equivalent of ethanol and 45 grams (0.4 mole) of 3-diethylamino-1-propyne under an atmosphere of nitrogen was stirred while the temperature was maintained between 35° and 40° C. for seven hours and between 25°–35° C. for fourteen hours. The mixture was then neutralized with aqueous acetic acid. The resulting organic layer was dried over dehydrated calcium sulfate and distilled. There was obtained 259 grams of unreacted ethyl carbonate which distilled at 48°–61° C./50→40 mm. and 52 grams of a mixture of 17% of ethyl beta,beta-diethoxy-gamma-diethylaminobutyrate and 83% of ethyl beta-ethoxy-gamma-diethylaminocrotonate which distilled at 78°–91° C./0.1 mm. The 0.22 mole of product represents a yield of 48% based on catalyst, 55% based on propyne, and 25% based on carbonate. The mixture was heated over sodium ethoxide (one gram) and then was distilled to produce ethanol and pure ethyl beta-ethoxy-gamma-diethylaminocrotonate which had a boiling range of 86°–93° C./0.3 mm., a refractive index, $n_D^{20}$, of 1.4650, a density, $$d_{20}^{20}$$

of 0.954, and a molecular refraction, $MR_D$, of 65.34.

On analysis, the ethyl beta-ethoxy-gamma-diethylaminocrotonate was found to have a carbon content of 62.53%, a hydrogen content of 10.00%, a nitrogen content of 6.11%, an equivalent weight of 229, while the calculated values for $C_{12}H_{23}NO_3$ are carbon, 62.84%; hydrogen, 10.12%; nitrogen, 6.11%; equivalent weight, 229; and molecular refraction, $MR_D$, 64.39.

EXAMPLE 3

Ethyl beta-ethoxy-gamma-methylnonylaminocrotonate

A mixture of 236 grams (2.0 moles) of ethyl carbonate, 71 grams (0.29 mole) of benzyl trimethyl ammonium ethoxide containing an equivalent of ethanol, and 59 grams (0.3 mole) of 3-methylnonylamino-1-propyne, the nonyl group in this compound being a 3,3,5-trimethylhexyl group, under an atmosphere of nitrogen was stirred and heated at 37°–38° C. for twelve hours and was then neutralized by the addition of aqueous acetic acid. The resulting organic layer was dried over anhydrous potassium carbonate and distilled. There was obtained 170 grams of unreacted ethyl carbonate which distilled at 43°–59° C./40 mm., 18 grams of unreacted propyne which distilled at 32°–55° C./0.2 mm., and 42 grams (0.13 mole) of crude ethyl beta-ethoxy-gamma-methylnonylaminocrotonate which distilled at 130°–158° C./0.5 mm. This represents a yield of 46% based on catalyst, 24% based on carbonate, and 64% based on propyne.

The product, after being heated over sodium ethoxide, was redistilled. It then distilled at 117°–123° C./0.15 mm. It had a refractive index, $n_D^{20}$, of 1.4615, a density, $$d_{20}^{20}$$

of 0.9235, and a molecular refraction, $MR_D$, of 93.22.

On analysis, the ethyl beta-ethoxy-gamma-methylnonylaminocrotonate was found to have a carbon content of 68.92%; a hydrogen content of 11.24%; and a nitrogen content of 4.58% while the calculated values for $C_{18}H_{35}NO_3$ are carbon, 68.96%; hydrogen, 11.26%; nitrogen, 4.69%, and molecular refraction, $MR_D$, 92.09.

EXAMPLE 4

Ethyl beta-ethoxy-gamma-N-morpholinocrotonate

A mixture of 1488 grams (12.6 moles) of ethyl carbonate and 149 grams (0.62 mole) of benzyl trimethyl ammonium ethoxide containing an equivalent of ethanol was stirred and the temperature maintained at 37°–40° C. under nitrogen by cooling while 488 grams (3.9 moles) of 3-(N-morpholino)-1-propyne was added during the period of one-half hour. The stirring was continued but the temperature was raised to 32°–38° C. for an additional thirty-one hours. The mixture was then cooled, neutralized by the addition of 37 grams (0.62 mole) of glacial acetic acid in ice water and the resulting two layers were separated. The organic layer was dried over anhydrous sodium sulfate and distilled. There was obtained 1203 grams of unreacted ethyl carbonate which boiled below 45° C./3 mm., 25 grams of unreacted propyne which boiled at 45°–47° C./3 mm., 204 grams of a mixture of 65% of ethyl beta,beta-diethoxy-gamma-(N-morpholino)butyrate and 35% of ethyl beta-ethoxy-gamma-(N-morpholino)crotonate which distilled at 120°–123° C./2 mm., and 248 grams of a mixture of 15% of butyrate and 85% of crotonate which distilled at 123°–140° C./2 mm. The total of 1.75 moles of product represents a yield of 284% based on catalyst, 48% based on propyne, and 72% based on carbonate.

The mixture was heated over sodium ethoxide (2 grams) and distilled to produce ethanol and pure ethyl beta-ethoxy-gamma-(N-morpholino)-crotonate. This product had a boiling range of 110°–112° C./0.3 mm. and a refractive index, $n_D^{20}$, of 1.4849.

This ethyl beta-ethoxy-gamma-N-morpholinocrotonate was found, on analysis, to have a carbon content of 59.57%, a hydrogen content of 8.63%, a nitrogen content of 5.91%, and an equivalent weight of 243. The calculated values for $C_{12}H_{21}NO_4$ are carbon, 59.23%; hydrogen, 8.71%; nitrogen, 5.75%; and equivalent weight, 243.

EXAMPLE 5

Ethyl 3-ethoxy-4-(N-morpholino)-6,6,8-trimethyl-2-nonenoate

A mixture of 236 grams (2.0 moles) of ethyl carbonate, 32 grams (0.13 mole) of benzyl trimethyl ammonium ethoxide containing an equivalent of ethanol, and 47.4 grams (0.2 mole) of 3-(N-morpholino)-5,7,7-trimethyl-1-octyne in an atmosphere of nitrogen was stirred and heated at 35°–40° C. for 30 hours and was then neutralized with aqueous acetic acid. The resulting organic layer was dried over anhydrous potassium carbonate and distilled to produce 184 grams of unreacted ethyl carbonate, which distilled at 40°–50° C./50 mm., 5 grams of unreacted octyne which distilled at 60°–70° C./0.6 mm., and 51 grams of crude ethyl 3-ethoxy-4-(N-morpholino)-6,6,8-trimethyl-2-nonenoate which distilled at 170°–195° C./0.6 mm. and had a refractive index, $n_D^{20}$, of 1.4760.

The 0.14 mole of product represents a yield of 108% based on catalyst, 81% based on octyne, and 32% based on carbonate.

The product, after being heated over sodium ethoxide (one gram), was redistilled at 149°–150° C./0.25 mm. It had a refractive index, $n_D^{20}$, of 1.4800, a density, $$d_{20}^{20}$$

of 0.983, and a molecular refraction, $MR_D$, of 102.7.

Analysis of this product, ethyl 3-ethoxy-4-(N-morpholino)-6,6,8-trimethyl-2-nonenoate, showed a carbon content of 67.62%, a hydrogen content of 10.54%, and nitrogen 4.10% while the calculated values for $C_{20}H_{36}NO_4$ are carbon, 67.76%; hydrogen, 10.24%; nitrogen, 3.95%, molecular refraction, $MR_D$, 100.7.

EXAMPLE 6

Methyl beta-methoxy-gamma-(N-morpholino)-crotonate

A mixture of 504 grams (5.6 moles) of methyl carbonate, 30 grams (0.14 mole) of benzyl trimethyl ammonium methoxide containing an equivalent of methanol, and 175 grams (1.4 moles) of 3-(N-morpholino)-1-propyne under an atmosphere of nitrogen was stirred and heated at 30°–60° C. for 44 hours and then neutralized with aqueous acetic acid. The resulting organic layer was dried over anhydrous sodium sulfate and distilled. There was obtained 440 grams of recovered methyl carbonate which distilled at 75°–93° C., 118 grams of recovered morpholinopropyne which distilled at 40°–45° C./0.3 mm., and 52 grams (0.24 mole) of methyl beta-methoxy-gamma-(N-morpholino)crotonate which distilled at 105°–115° C./0.3 mm. The yield was 210% based on catalyst, 53% based on propyne, and 24% based on carbonate. The product was redistilled from sodium methoxide (0.2 grams) at 100°–110° C./0.3 mm. It had a refractive index, $n_D^{20}$, of 1.4936, a density, $$d_{20}^{20}$$

of 1.118, and a molecular refraction, $MR_D$, of 55.98.

On analysis, this product, methyl beta-methoxy-gamma-(N-morpholino)crotonate, was found to have a carbon content of 56.15%, hydrogen, 7.85%, and nitrogen 6.48%. The equivalent weight was 217. The calculated values for $C_{10}H_{17}NO_4$ are molecular refraction, $MR_D$, 54.59; carbon, 55.81%, hydrogen, 7.96%; nitrogen, 6.51%, and equivalent weight, 215.

EXAMPLE 7

Methyl beta-methoxy-gamma-dimethylaminocrotonate

A mixture of 2.16 moles of methyl carbonate, 0.55 mole of 3-dimethylamino-1-propyne, and 0.2 mole of commercial sodium methoxide under an atmosphere of dry nitrogen was stirred and heated at 81°–85° C. for three hours, washed with water, dried over anhydrous potassium carbonate and distilled to produce a mixture of 0.11 mole of unreacted propyne and 1.07 moles of unreacted carbonate which distilled at 75°–93° C. and 0.21 mole of methyl beta-methoxy-gamma-dimethylaminocrotonate which distilled at 68°–95° C./0.4 mm. The yield represented 105% based on catalyst, 48% based on propyne, and 19% based on carbonate.

The product was distilled from sodium methoxide (0.1 gram) to produce pure methyl beta-methoxy-gamma-dimethylaminocrotonate which had a boiling point of 60–61° C./0.25 mm., a refractive index, $n_D^{20}$, of 1.4650, a density, $$d_{20}^{20}$$

of 1.021, and a molecular refraction, $MR_D$, of 46.89.

Analysis of this product, methyl beta-methoxy-gamma-dimethylaminocrotonate, showed a carbon content of 55.13%, a hydrogen content of 8.81%, a nitrogen content of 7.82%, and an equivalent weight of 176 while the calculated values for $C_8H_{15}O_3N$ are carbon, 55.47%; hydrogen, 8.73%; nitrogen, 80.3%; equivalent weight, 173; and molecular refraction, 45.91.

EXAMPLE 8

*Octyl beta-octoxy-gamma-dimethylaminocrotonate*

Sodium amide was prepared from 0.46 gram (0.02 mole) of sodium in liquid ammonia. The ammonia was evaporated, 8.3 grams (0.1 mole) of 3-dimethylamino-1-propyne, 116 grams (0.58 mole) of octyl carbonate, and 8.3 grams of additional dimethylamino-1-propyne were added in that order. The mixture was stirred at 26° C. for three hours and at 40° C. for two hours, after which it was filtered and distilled. There was obtained 12.6 grams of dioctyl carbonate which distilled at 56°–157° C./0.3 mm. which had a refractive index, $n_D^{20}$, of 1.4373 and 7 grams of a mixture consisting of 47% of octyl beta,beta-dioctoxy-gamma-dimethylaminobutyrate and 53% of octyl beta-octoxy-gamma-dimethylaminocrotonate which came over at 157°–187° C./0.3 mm. and had a refractive index, $n_D^{20}$, of 1.4550 and, on analysis, was found to have a nitrogen content of 4.05%.

We claim:

1. A process which comprises reacting together at 20° C. to 110° C. in the presence of an anhydrous, strongly basic catalyst, which catalyst is a member of the class consisting of alkali metal acetylides, alkali metal alcoholates, and quaternary ammonium alcoholates, the quaternary group of which is capable of yielding a quaternary ammonium hydroxide, a carbonate, $$(RO)_2CO$$

and a tertiary propargylmonoamine,

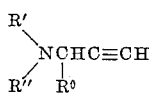

destroying the catalyst, and separating esters of the formula

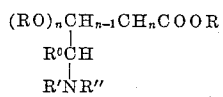

wherein R is a non-tertiary hydrocarbon group, R° is a member of the class consisting of hydrogen and monovalent hydrocarbon groups of not over eight carbon atoms, R' and R'' are members of the class consisting of monovalent hydrocarbon groups when taken individually and when taken together one of the saturated divalent chains —CH₂CH₂CH₂CH₂—,

—CH₂CH₂CH₂CH₂CH₂—, —CH₂CH₂OCH₂CH₂— and —CH₂CH₂SCH₂CH₂— which jointly with the nitrogen forms a five- to six-sided heterocycle, and $n$ is an integer from one to two.

2. A process which comprises reacting together at 20° C. to 110° C. in the presence of an anhydrous, strongly basic catalyst, which catalyst is a member of the class consisting of alkali metal acetylides, alkali metal alcoholates, and quaternary ammonium alcoholates, the quaternary group of which is capable of yielding a quaternary ammonium hydroxide, a carbonate, $$(RO)_2CO$$

and a propargylamine,

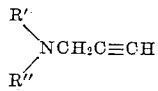

destroying the catalyst, and separating esters of the formula

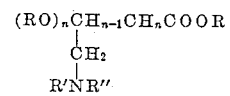

wherein R is a primary alkyl group of not over twelve carbon atoms, R' and R'' are alkyl groups which together contain a total of not over eleven carbon atoms, and $n$ is an integer from one to two.

3. A process which comprises reacting together at 20° C. to 110° C. in the presence of an anhydrous, strongly basic catalyst, which catalyst is a member of the class consisting of alkali metal acetylides, alkali metal alcoholates, and quaternary ammonium alcoholates, the quaternary group of which is capable of yielding a quaternary ammonium hydroxide, a carbonate, $$(RO)_2CO$$

and the propargylamine,

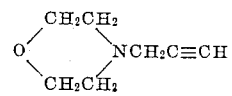

destroying the catalyst, and separating esters of the formula

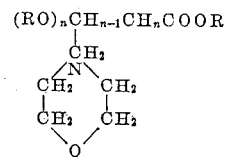

wherein R is a primary alkyl group of not over twelve carbon atoms and $n$ is an integer from one to two.

4. A process which comprises reacting together at 20° C. to 110° C. in the presence of an anhydrous, strongly basic catalyst, which catalyst is a member of the class consisting of alkali metal acetylides, alkali metal alcoholates, and quaternary ammonium alcoholates, the quaternary group of which is capable of yielding a quaternary ammonium hydroxide, a carbonate, $$(RO)_2CO$$

and the propargylamine,

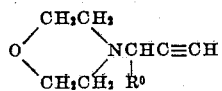

destroying the catalyst, and separating esters of the formula

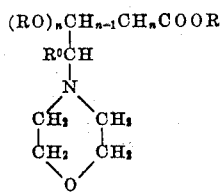

wherein R is a primary alkyl group of not over twelve carbon atoms, R° is an alkyl group of not over eight carbon atoms, and $n$ is an integer from one to two.

JOHN O. VAN HOOK.
WILLARD J. CROXALL.

REFERENCES CITED

The following references are of record in the file of this patent:

UNITED STATES PATENTS

| Number | Name | Date |
|---|---|---|
| 1,927,858 | Ulrich et al. | Sept. 26, 1933 |
| 2,098,954 | Dalmer et al. | Nov. 16, 1937 |
| 2,119,802 | Westphal et al. | June 7, 1938 |
| 2,273,141 | Reppe | Feb. 17, 1942 |

FOREIGN PATENTS

| Number | Country | Date |
|---|---|---|
| 116,642 | Australia | Nov. 11, 1943 |